July 24, 1923.
A. L. SHAW
CONVEYER CARRIAGE
Filed Nov. 4, 1918
1,462,986
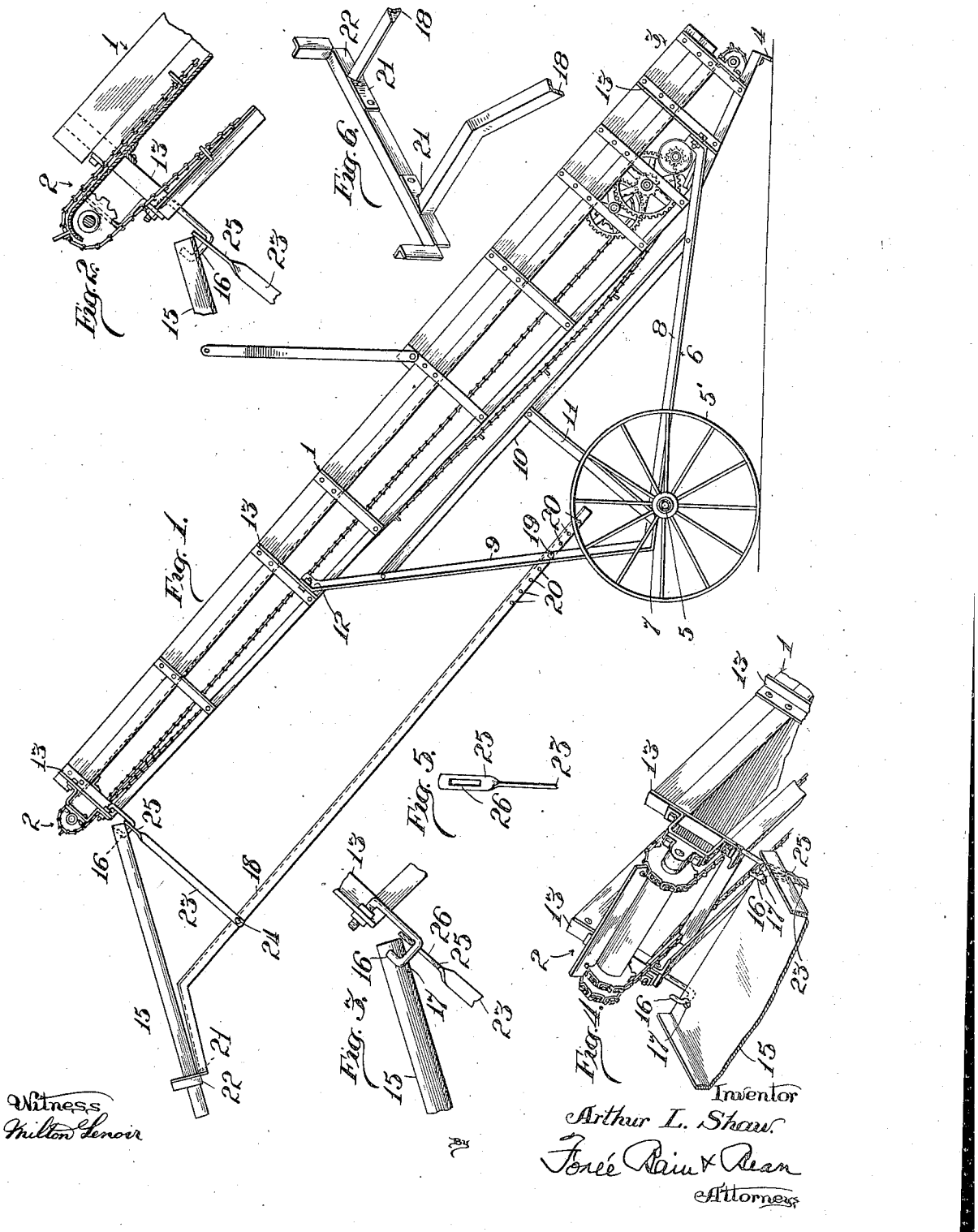

Patented July 24, 1923.

1,462,986

UNITED STATES PATENT OFFICE.

ARTHUR L. SHAW, OF CHICAGO, ILLINOIS, ASSIGNOR TO CHICAGO AUTOMATIC CONVEYOR CO., OF CHICAGO, ILLINOIS, A CORPORATION OF ILLINOIS.

CONVEYER CARRIAGE.

Application filed November 4, 1918. Serial No. 260,963.

*To all whom it may concern:*

Be it known that I, ARTHUR L. SHAW, a citizen of the United States, residing at Chicago, in the county of Cook and State of Illinois, have invented certain new and useful Improvements in Conveyer Carriages, of which the following is a specification.

This invention relates to improvements in conveyer carriages or wheeled truck frames for movably supporting portable conveyers and the like, being especially adapted for supporting conveyers such as illustrated in my prior Patent No. 1,255,345 issued February 5th, 1918.

The principal object of this invention is the provision of a wheel or truck frame on which may be detachably mounted a conveyer so that the same may conveniently and easily be transported or moved from place to place, as desired, in utilizing the same.

Another object of this invention is the provision of such a wheel or truck frame having means for adjustably supporting a discharge chute mounted at the head or discharge end of the conveyer.

Further objects of this invention include improvements in details of construction and arrangement, whereby a simple device of this character is provided, which may be readily installed and easily removed from the conveyer or other mechanism it supports.

To the accomplishment of the foregoing and such other objects as may hereinafter appear, my invention consists in the construction, combination and arrangement of parts hereinafter described and then sought to be defined in the appended claims, reference being had to the accompanying drawings forming a part hereof and which show merely for the purpose of illustrative disclosure a preferred embodiment of my invention, it being expressly understood that various changes may be made within the scope of the claims without digressing from my inventive idea.—

In the drawings—

Fig. 1 represents a view in side elevation of an apparatus constructed to embody my invention showing one type of portable conveyer.

Fig. 2 is a horizontal section of the head end of the same.

Fig. 3 is a detail section showing the manner of supporting the discharge chute from the conveyer and the connection of the links thereto.

Fig. 4 is a perspective view of the head and of the conveyer and discharge chute.

Fig. 5 is a view of a detail.

Fig. 6 is a perspective view of the front end of the chute brace.

Referring now to the drawing, the numeral 1 indicates a conveyer, such as illustrated in my prior Patent No. 1,255,345 above referred to, having the head or discharge end 2 and having a base or bottom end 3. The frame of this conveyer is preferably provided at its bottom end with a transverse member 4 for supporting the conveyer on the ground. Conveyers of this type are adapted to be transported or moved from place to place, according to the location for loading or unloading or other utilization of the mechanism and it is the purpose of my invention to provide a simple, effective and easily attached wheel truck or frame for such a conveyer for the purpose of transporting the same, as above set forth.

This wheel truck or frame comprises the axle 5 having the supporting wheel 5' on each end thereof. The main frame parts 6, of which there are two, are supported on this axle. The parts 6 are parallel and each part is bent in the form of an angle, as at 7, having the horizontal portion 8, and the upwardly extending portion 9. One part is located on each side of the machine and constitutes main frame members, which are suitably braced by the longitudinally extending frame members 10, with upwardly extending frame members 11 connected thereto, so as to form a strong and secure construction. The ends of the parts 8 and 9 of the main frame members 6—6 are bent, as at 12, so as to be securely connected to the vertical post or support 13 of the conveyer, by bolts or other similar and suitable attaching means.

It is, therefore, seen that this construction provides a very simple and effective means of support for transportation, a mechanism of the character illustrated, and which may be readily attached to and detached from said mechanism.

When a discharge chute 15 is in use at the head end of the conveyer, as shown in Figs. 1, 2, 3 and 4, means are provided for supporting the outer or free end of the discharge chute. The discharge chute is pivotally mounted at the head or discharge end of the conveyer by means of the hooks 16—16 passing thru apertures 17—17 in the discharge chute, these hooks being suitably secured to the frame parts of the conveyer. The discharge chute supporting frame comprises the elongated side members 18—18 which are adjustably secured to the upwardly extending parts 9—9 of the main frame members 6—6 at their lower ends by means of the bolts 19 engaging any one of a plurality of apertures 20 therein. These side members 18 extend a sufficient length to reach the under part of the chute 15 when in proper discharge position, as indicated in Fig. 1 of the drawings, and are there bent or provided with extensions, as indicated at 21, which are secured to the transverse supporting member 22 on the under side of the discharge chute 15. At an intermediate point these frame members 18—18 are supported from the frame of the conveyer by means of the links 23—23, which are pivotally connected thereto, as at 24, and having their flat end portions 25 turned at right angles to the body thereof and provided with the elongated slot or aperture 26, which slips over the end of the hooks 16—16 previously referred to.

It is, therefore, seen that in addition to the simple form of wheel truck I also provide a simple and readily adjustable means for supporting the discharge chute 15 in any desired position, adjustment being made with facility.

The various frame parts are preferably formed of angle iron, which may be made of any other suitable material, as is well understood.

Having described my invention, what I claim is:—

1. An apparatus of the character described for portably supporting a conveyer including in combination with a conveyer, a wheeled frame comprising a main frame, composed of a pair of side members each bent at an intermediate point to provide an upwardly extending part and a laterally extending part, the ends of said parts arranged to receive means for securing the frame to a conveyer; a discharge chute; means to hingedly support the discharge chute on the discharge end of the conveyer; an additional frame adjustably connected to the main frame, having its extended end supporting the discharge chute and link members for pendantly supporting said additional frame from the discharge end of the conveyer.

2. An apparatus of the character described for portably supporting a conveyer and its discharge chute, including in combination a frame, wheels for supporting said frame, said frame having means for connecting the same to said conveyer, a discharge chute connected to the discharge end of said conveyer, an additional frame comprising a pair of elongated side members secured to said frame and of sufficient length to reach said discharge chute, a transverse member, the outer ends of said side members being connected to said transverse member, said transverse member resting under and supporting said discharge chute, said transverse member having upright extensions on either side thereof, the discharge chute resting between said upright extensions.

3. An apparatus of the character described for portably supporting a conveyer and its discharge chute including in combination a frame, wheels for supporting said frame, said frame having means for connecting the same to said conveyer, an additional frame adjustably connected to said main frame, its upper end being adapted to engage and support the free end of a chute to be connected to the discharge end of the conveyer and a pair of links pivotally connected to said additional frame and the discharge end of the conveyer.

4. An apparatus of the character described including in combination a conveyer, a wheeled frame for portably supporting said conveyer comprising a main frame; wheels for supporting said main frame, said main frame being composed of a pair of side members, each bent at an intermediate point to provide an upwardly extending part and a laterally extending part, the ends of said parts being bent and adapted to receive securing means for attaching the same to said conveyer, a discharge chute; hooks at the discharge end of said conveyer for hingedly supporting said discharge chute; an additional frame, adjustably connected to said main frame, having its upper end extending to and supporting said discharge chute and link members pivotally connected to said additional frame and to said hooks on said conveyer.

5. An apparatus of the character described including in combination a conveyer, a wheeled frame for transporting said conveyer, said frame comprising a main frame, wheels for supporting said main frame, said main frame comprising a pair of side members each being bent at an intermediate point to provide an upwardly extending part and a laterally extending part, the ends of said parts being bent and adapted to receive securing means for connecting the same to said conveyer; hooks at the discharge end of said conveyer; a discharge chute hinged to the discharge end of said conveyer by said hooks, the conveying means in said conveyer extending over said discharge chute a sufficient distance to insure the discharge of the material into said discharge chute; an additional frame comprising a pair of elongated side members, each being adjustably connected to the side members of the main frame and extending upwardly to support the free end of said discharge chute and a link pivotally connected to each of the side members of said additional frame and to said hooks on said conveyer.

In testimony whereof I hereunto subscribed my name.

ARTHUR L. SHAW.